United States Patent [19]

Dadgar

[11] Patent Number: 4,804,484
[45] Date of Patent: Feb. 14, 1989

[54] ANTIFLOC ADDITIVES FOR SODIUM BROMIDE COMPOSITIONS

[75] Inventor: Ahmad Dadgar, Lafayette, Ind.

[73] Assignee: Great Lakes Chemical Corporation, West Lafayette, Ind.

[21] Appl. No.: 71,507

[22] Filed: Jul. 9, 1987

[51] Int. Cl.$^4$ .......................... E21B 43/00; C01D 3/10
[52] U.S. Cl. .............................. 252/8.551; 252/8.514; 252/384; 423/268
[58] Field of Search .................. 252/8.514, 8.551, 383, 252/384; 423/266, 268, 265

[56] References Cited

U.S. PATENT DOCUMENTS

| | | | |
|---|---|---|---|
| 2,990,246 | 6/1961 | Scott et al. | 423/268 |
| 3,000,708 | 9/1961 | Kapsenberg | 23/303 |
| 3,095,281 | 6/1963 | Schinkel | 23/300 |
| 3,856,922 | 12/1974 | Bragdon | 423/268 |
| 3,987,077 | 10/1976 | Bragdon | 423/268 X |
| 4,123,376 | 10/1978 | Gray | 252/99 |
| 4,554,081 | 11/1985 | Borchardt et al. | 252/8.551 X |
| 4,566,976 | 1/1986 | House et al. | 252/8.551 X |
| 4,609,476 | 9/1986 | Heilweil | 252/8.551 |
| 4,619,773 | 10/1986 | Heilweil et al. | 252/8.514 |

FOREIGN PATENT DOCUMENTS 1003216 5/1962 United Kingdom .

OTHER PUBLICATIONS

L. Phoenix, British Chemical Engineering, vol. II, No. 1 (Jan., 1966), pp. 34–38.
Sarig et al., Crystal Habit Modifiers, J. of Crystal Growth, 28 1975, pp. 295–299.

Primary Examiner—Herbert B. Guynn

[57] ABSTRACT

Solid sodium bromide and aqueous sodium bromide solutions incorporate sodium tartrate and one or more amides of nitrolotriacetic acid in order to inhibit floc formation in aqueous sodium bromide solutions in the pH range 6–12 and in order to insure that the solid sodium bromide is free flowing.

9 Claims, No Drawings

ANTIFLOC ADDITIVES FOR SODIUM BROMIDE COMPOSITIONS

BACKGROUND OF THE INVENTION

1. Field of the Invention

This invention relates to additives for sodium bromide compositions and particularly, to additive mixtures which eliminate floc formation in sodium bromide brines and insure that solid sodium bromide flows freely.

2. Description of the Prior Art

Aqueous solutions of alkali and alkaline earth metal and zinc halides, and mixtures thereof, are commonly used as drilling, completion, packer and perforating media in oil and gas wells. Depending on the formation pressures encountered in the well, fluids with densities between 8.5 and 21.0 lb/gal are designed to provide a hydrostatic head to balance formation pressures. The advent of the so-called solids-free brines in recent years has greatly improved the completion and workover activities by eliminating formation plugging and solids settling problems previously encountered when water-based and oil-based drilling fluids were used.

Although the introduction of these various new completion fluids has helped resolve many of the difficulties encountered in completion and workover operations, problems still remain. For example, use of completion fluids contaminated with alkaline earth and transition metal ions in subterranean wells containing carbonates and sulfates results in precipitation of metal carbonates and sulfates. Further, it has been reported by Shaughnessy, et al, in "Workover Fluids for Prudhoe Bay", Exxon Report No. 3187, February-July 1977, that the mixing of calcium chloride workover fluids with formation brines under certain conditions (i.e., at a pressure of 5000 psi and a temperature of 220° F.) can lead to the precipitation of calcium carbonate within reservoir rock resulting in formation damage. These problems have heretofore been resolved, at least for shallow wells, by utilizing sodium bromide completion and workover fluids in place of calcium ion containing solutions.

Sodium bromide solutions used as completion and workover fluids, have a pH range between 6.5 and 7.5. At these pH values, small concentrations of alkaline earth and transition metal ions in sodium bromide stay in solution and may go unnoticed at the time sodium bromide fluids are utilized. However, when such sodium bromide fluids are used in wells with formation brines at high pH and high carbon dioxide content, precipitation of metal carbonates and hydroxides can lead to formation damage.

Moreover, sodium bromide fluids prepared from "by-product" or "recycle" brines usually contain small concentrations of organic and inorganic materials. The organic materials, such as phenols and substituted phenols, are removed by passing the fluid through an activated carbon bed. However, it is also desirable to remove or solubilize low concentration inorganic contaminants (e.g. $Ca^{2+}$, $Mg^{2+}$, $Al^{3+}$, $Fe^{2+}$, $Zn^{2+}$, $Ni^{2+}$) which are also present in such recycle brines.

Sodium bromide solutions used as completion and workover fluids may be formulated in the field from solid sodium bromide. In addition, solid sodium bromide is also used as a weighting additive for brines. In order to be successfully used, such sodium bromide should be free flowing.

Amides of nitrilotriacetic acid have been used as anti-caking additives for sodium chloride produced by crystallization processes. It is believed that these amides significantly modify the crystal habits of sodium chloride and therefore act as crystal growth inhibitors or anti-caking agents. British Patent Specification No. 1,003,216 teaches that sodium chloride crystals obtained by crystallizing sodium chloride from a brine in the presence of nitrilotriacetamide, $N=(CH_2CONH_2)_3$, are three dimensional dendrites having a low caking tendency. Methods for inhibiting the caking of inorganic salts are also taught by L. Phoenix, British Chemical Engineering, Vol.II, No. 1 Jan. 1966), pp.34–38. In addition, U.S. Pat. Nos. 2,990,246. Scott et al; 3,856,922, Bragdon; 3,987,077, Bragdon et al, teach the use of different amides of nitrilotriacetic acid for modifying the appearance or the crystal habits of sodium chloride leading t its reduced caking tendency.

A mixture of mono- di- and triamides of nitrilotriacetic acid has been used to reduce the caking tendency of sodium bromide produced by a spray drying process. However, because sodium bromide is not produced by crystallization, it is unlikely that these amides act as crystal habit modifiers for NaBr. It is believed that the amides of nitrilotriacetic acid act as a surface binder for NaBr and therefore prevent it from caking.

None of the prior art for sodium chloride mentioned above teaches the use of amides of NTA in combination with sodium tartrate as antifloc and anticaking additives for sodium bromide solution and spray dried sodium bromide produced from the solution.

Accordingly, a primary object of the present invention is to provide an additive mixture for sodium bromide fluids capable of solublizing metal carbonate and metal hydroxide precipitates.

A further objective of the present invention is to find a suitable solubilizing additive which can effectively form soluble compounds with alkaline earth, transition, and aluminum metal ions in the pH range of 6-12.

A related object is to provide a combination of additives of the character described which insures that sodium bromide solids flow freely.

SUMMARY OF THE INVENTION

The foregoing and other objectives advantages, and features of the subject invention may be achieved with sodium bromide compositions incorporating an effective amount of sodium tartrate and, optionally, one or more amides of nitrilotriacetic acid.

In its method aspect, the present invention embodies the injection of aqueous solutions of sodium bromide containing an effective amount of sodium tartrate, and, optionally, one or more amides of nitriolotriacetic acid into oil and gas wells.

DETAILED DESCRIPTION OF THE PREFERRED EMBODIMENTS

Aqueous sodium bromide (normally 46 wt. %) is used in oil and gas wells as completion and workover fluid. While 46 wt. % sodium bromide solution is the maximum sodium bromide content that may be used, less dense solution (e.g., 4 wt. % up to 46 wt. %) may be used under appropriate conditions as is known in the art. Dry sodium bromide prepared from the solution (by crystallization, spray drying, or other techniques known in the art) is used for weighting up the diluted fluids after an application. Sodium bromide is used instead of calcium chloride in oil and gas wells of high carbonate and sulfate ion concentrations in order to prevent formation damage caused by the precipitation of $CaCO_3$ and $CaSO_4$.

It has been discovered that addition of alkali metal and ammonium salts of tartaric acid, optionally in combination with one or more amides of nitrilotriacetic acid ("NTA"), can be employed to eliminate flocs in sodium bromide fluids and caking in dry sodium bromide. The terms "flocs" and "flocculation" are used herein in their customary broad sense to encompass the insoluble precipitation formed in brines during their formulation and use.

Frequently "by-product" sodium bromide solutions are alkaline (pH ~12) and contain about 30 to 40 wt. % sodium bromide. Enough water is stripped off to make a 46 wt. % solution before adjusting the pH to 6.5-7.5. If the concentration of bromate in sodium bromide solution exceeds 10 ppm, the solution is first treated with hydrazine and then stored for one week before filtering it through diatomaceous earth in a rotary drum filter and an activated carbon bed.

In accordance with this invention, the sodium bromide fluid is then treated with an additive comprising an alkali metal or ammonium tartrate, preferably sodium tartrate, and, optionally, one or more amides of NTA. The resulting solution has a density of 12.5 lb/gal and is used as a completion fluid or may be spray dried to obtain a solid sodium bromide. Alternatively, the additives of this invention may be admixed with dried solid sodium bromide.

Desirably. additives of this invention are supplied to sodium bromide fluids at a total level of about 0.1-1.0, preferably about 0.2-0.4, parts per 100 parts of the sodium bromide fluid. More particularly alkali metal or ammonium tartrate is supplied to the fluid at a level of about 0.1-1.0, preferably about 0.15-0.35, parts per 100 parts of sodium bromide fluid, while mixed mono-, di- and tri-amides of NTA are provided at a level of about 0-0.2, preferably about 0.02-0.05 parts per 100 parts of the sodium bromide fluid.

Where the additives are supplied directly to solid sodium bromide, the sodium tartrate is supplied at a level of about 0.2-2.0, preferably about 0.3-0.8% by weight of the composition, and the amides of NTA are supplied at a level of about 0-0.4 percent by weight of the composition.

Where the additives are incorporated in sodium bromide fluids which are to be spray dried, the sodium tartrate is provided at a level of about 0.21-2.0, preferably about 0.3-0.8% by weight of the sodium bromide content of the fluid, and the amides of NTA are provided at a level of about 0-0.4% by weight of the sodium bromide content of the fluid.

In accordance with this invention, one or more of the mono-, di-, and tri-amides of NTA may be employed. More particularly, the mono-amide of NTA, the di-amide of NTA, or the tri-amide of NTA may be employed alone. In addition, mixtures of such amides may also be employed. Thus, mixtures of the mono- and di-amides, mixtures of the di- and tri-amides and mixtures of the mono- and tri-amides may also be used. It is especially preferred in accordance with the present invention to employ a mixture of the mono-, di- and tri-amides of NTA. One especially suitable mixture of such amides is a mixture of mono-, di- and tri-amides of nitrilotriacetic acid commercially available from W. R. Grace Company under the trademark "HAMPAMIDE B".

The following examples are provided for the purpose of further illustration of the preferred embodiment of the present invention and are not intended to be limitations on the disclosed invention.

Exemplary sodium bromide fluids and solids containing additives in accordance with the present invention are shown in the following examples:

EXAMPLE I

| Constituent | Parts by Weight |
| --- | --- |
| 46 wt. % aqueous NaBr | 99.77 |
| Mono-, di- and tri-amides of NTA | 0.05 |
| Disodium salt of tartaric acid | 0.18 |

This is the composition of liquid sodium bromide containing additives which is used in Example VII.

EXAMPLE II

| Constituent | Parts by Weight |
| --- | --- |
| Spray dried NaBr | 99.50 |
| Mono-, di- and tri-amides of NTA | 0.11 |
| Disodium salt of tartaric acid | 0.39 |

This is the composition of spray dried sodium bromide containing additives. which is used in Example VII.

COMPARATIVE EXAMPLE III

Disodium salt of NTA (2.8 g) was added to 1400 g of a "by-product" NaBr solution (46 wt. %). The resulting solution was then divided into seven equal portions and the pH of each portion was adjusted with 2M NaOH or 2M HCl in order to have solutions with pH values of 6, 7, 8, 9, 10, 11 and 12.

After pH adjustment, the solutions were all clear with no observable precipitate of floc. After one week, small amounts of floc were found in the solutions with pH values of 6, 7, 8, 11 and 12. The extent of floc formation in the solutions with pH values of 9 and 10 was lower than that observed for other solutions.

COMPARATIVE EXAMPLES IV-V

The sodium bromide solution used and the experimental procedures were the same as described in Example III but, instead of disodium salts of NTA, 2.8 g $Na_2$-EDTA (Example IV) and 2.8 g sodium citrate (Example V) were used. Although all solutions were clear in the beginning, floc formation was the same after one week as in Example III.

EXAMPLE VI

Following similar procedures as in Example III but substituting sodium tartrate in place of $Na_2$.NTA, solutions covering the pH range of 6-12 were prepared. All solutions were clear in the beginning and showed no floc formation after one week.

The results of Examples III, IV and V indicate that in the pH range of 6-8, NTA, EDTA, and citric acid will precipitate from solution causing floc formation. Also, in the pH range of 11-12, NTA and EDTA do not form stable complexes with $Al^{3+}$, and therefore cannot prevent floc formation due to aluminate precipitation. Sodium tartrate, on the other hand, forms stable complexes with alkaline earth transition metals and aluminum and, therefore, it can prevent the formation of floc in the pH range of 6–12.

EXAMPLE VII

The laboratory results obtained in Examples I–VI clearly indicate that only sodium tartrate can effectively solubilize metal carbonate and metal hydroxide precipitates formed in "by-product" or "recycle" sodium bromide in the pH range of 6 to 12.

To evaluate the effectiveness of sodium tartrate and NTA mixed mono-, di- and tri-amides as solubilizing additives in both liquid and dry "by-product" sodium bromide, sodium bromide solutions containing different additives were spray dried using a 10 ft commercial size spray drier. The sodium bromide feed and additives used are given in Table 1:

TABLE 1

| Test No. | Feed Samples Used in Spray Drying Tests Feed |
| --- | --- |
| 1 | 46 wt. % sodium bromide - no additive |
| 2 | 46 wt. % sodium bromide + 0.18 wt. % sodium tartrate |
| 3 | 46 wt. % sodium bromide + 0.18 wt. % sodium tartrate + 0.05 wt. % mixed mono-, di- and tri-amides of NTA |

The spray dried sodium bromide samples were dissolved in water to make a 46 wt. % solution. The pH of liquid feeds and redissolved sodium bromide solutions was raised to 12 (using 15% NaOH), and the samples were then examined for the formation of precipitates. The results are presented in Table 2:

TABLE 2

| Sample | Spray Drying Test Results pH | Floc | Comments |
| --- | --- | --- | --- |
| Test No. 1, 46 wt. % NaBr, no additive | | | |
| Liquid feed | 6.5 | No | No scum on top |
| Liquid feed | 12.0 | Yes | Slight scum on top and floc on bottom |
| Solution from | 6.5 | No | Slight scum on top |
| spray dried salt | 12.0 | Yes | Scum on top and floc on bottom |
| Test No. 2, 46 wt. % NaBr + sodium tartrate | | | |
| Liquid feed | 6.6 | No | No scum on top |
| Liquid feed | 12.0 | No | No scum or floc |
| Solution from | 6.7 | No | Scum on top |
| spray dried salt | 12.0 | No | Scum on top |
| Test No. 3, 46 wt. % NaBr + sodium tartrate + mixed NTA amides | | | |
| Liquid feed | 6.5 | No | No scum on top |
| Liquid feed | 12.0 | No | No scum or floc |

TABLE 2-continued

| Sample | Spray Drying Test Results pH | Floc | Comments |
| --- | --- | --- | --- |
| Solution from | 6.6 | No | Slight scum on top |
| spray dried salt | 12.0 | No | Slight scum on top |

The results presented in Table 2 indicate:
1. Sodium tartrate, alone and with mixed mono-, di- and tri-amides of NTA, effectively solubilizes the metal hydroxides and carbonates in both liquid feeds and solutions prepared from spray dried sodium bromide.
2. Low amounts of scum are always present in all sodium bromide solutions (NaBr from reaction between NaOH and HBr or "by-product" NaBr) prepared from spray dried materials, possibly due to small impurities in sodium bromide feed.

The combination of mixed NTA mono-, di- and tri-amides with sodium tartrate minimizes the extent of scum formation in both liquid and dry sodium bromide.

I claim:

1. Sodium bromide compositions comprising an amount effective to inhibit flock formation of an additive composition comprising about 0.1–1.0 parts by weight of an alkali metal or ammonium tartrate and, optionally, about 0.0–2 parts by weight of one or more of the mono- di- and tri-amides of nitrilotriacetic acid, all per 100 parts by weight sodium bromide composition.

2. A composition, as claimed in claim 1, and compmrising a mixture of mono-, di- and tri-amides of nitrilotriacetic acid.

3. A composition, as claimed in claim 2, in the form of an aqueous sodium bromide solution containing up to about 46% sodium bromide by wieght of the solution.

4. A composition, as claimed in claim 3, wherein the alkali metal or ammonium tartrate is sodium tartrate.

5. A composition, as claimed in claim 3, wherein the aqueous sodium bromide solution has a pH lying in the range of about 6–12.

6. A sodium bromide composition in solid form containing an alkali metal or ammonium tartrate and is present at a level of about 0.2–2.0 percent and a mixture of mono-, di- and tri- amides of nitrilotriacetic acid present at a level of about 0–0.4%, all by weight of the composition.

7. A method for completion and workover of oil and gas wells comprising injecting therein an aqueous sodium bromide composition comprising about 0.1–1.0 parts by weight of an alkali metal or ammonium tartrate and about 0–0.2 parts by weight of one or more of the mono-, di-, and tri-amides of nitrilotriacetic acid, all per 100 parts by weight of the solution.

8. A method, as claimed in claim 7, wherein the composition comprises a mixture of mono-, di-, and tri-amides of nitrilotriacetic acid.

9. A method, as claimed in claim 8, wherein the tartrate is sodium tartrate.

* * * * *

UNITED STATES PATENT AND TRADEMARK OFFICE
CERTIFICATE OF CORRECTION

PATENT NO. : 4 804 484

DATED : February 14, 1989

INVENTOR(S) : Ahmad Dadgar

It is certified that error appears in the above-identified patent and that said Letters Patent is hereby corrected as shown below:

Col. 2, line 20, after "leading" "t" should be --to--

Col. 2, line 47, after "objectives" insert --,--

Col. 3, line 33, after "desirably" "." should be --,--

Col. 6, lines 25 and 26, "compmrising" should be --comprising--

Signed and Sealed this

Tenth Day of October, 1989

Attest:

DONALD J. QUIGG

Attesting Officer

Commissioner of Patents and Trademarks